United States Patent
Gao

(10) Patent No.: US 11,622,407 B2
(45) Date of Patent: Apr. 4, 2023

(54) DATA TRANSMISSION METHOD, DATA TRANSMISSION APPARATUS, STORAGE MEDIUM, AND TERMINAL FOR DUAL CONNECTION MODE OF NON-STANDALONE NETWORKING

(71) Applicant: BEIJING XIAOMI MOBILE SOFTWARE CO., LTD., Beijing (CN)

(72) Inventor: Yi Gao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 43 days.

(21) Appl. No.: 16/951,426

(22) Filed: Nov. 18, 2020

(65) Prior Publication Data
US 2021/0368575 A1 Nov. 25, 2021

(30) Foreign Application Priority Data
May 22, 2020 (CN) .......................... 202010438520.6

(51) Int. Cl.
*H04W 76/25* (2018.01)
*H04L 43/16* (2022.01)
(Continued)

(52) U.S. Cl.
CPC .............. *H04W 76/25* (2018.02); *H04L 43/16* (2013.01); *H04W 24/08* (2013.01);
(Continued)

(58) Field of Classification Search
CPC ....... H04W 88/02; H04W 88/06; H04W 4/80; H04W 76/15; H04W 76/16; H04W 76/20;
(Continued)

(56) References Cited

U.S. PATENT DOCUMENTS

| 2019/0200406 A1* | 6/2019 | Henttonen | ............ H04L 5/0091 |
| 2021/0022073 A1* | 1/2021 | Kwok | .................. H04W 76/15 |

FOREIGN PATENT DOCUMENTS

| CN | 110381549 A | 10/2019 |
| CN | 110913504 A | 3/2020 |

(Continued)

OTHER PUBLICATIONS

Extended European Search Report (EESR) in EP 21159305.8 dated Jul. 19, 2021.
(Continued)

*Primary Examiner* — Peter Chen
(74) *Attorney, Agent, or Firm* — Syncoda LLC; Feng Ma

(57) ABSTRACT

A data transmission method, applied to a terminal that uses a dual connection mode of non-standalone networking for data transmission, includes: monitoring a network signal quality in the dual connection mode of non-standalone networking, and monitoring a real-time data packet transmission rate of a data packet transmitted and received by the terminal; and adjusting, based on the network signal quality and the real-time data packet transmission rate, the dual connection mode of non-standalone networking, which includes turning off the dual connection mode of non-standalone networking or maintaining the dual connection mode of non-standalone networking. Automatic and dynamic switching between EN-DC dual connection and single 4G network connection can be realized, without manually switching networks by users, such that effective transmission and reception of terminal data packets is ensured, and increase in power consumption caused by always relying on the EN-DC dual connection is avoid.

15 Claims, 3 Drawing Sheets

(51) Int. Cl.
*H04W 24/08* (2009.01)
*H04W 52/02* (2009.01)
*H04W 52/26* (2009.01)
*H04W 88/06* (2009.01)

(52) U.S. Cl.
CPC ..... *H04W 52/0212* (2013.01); *H04W 52/265* (2013.01); *H04W 88/06* (2013.01)

(58) Field of Classification Search
CPC ..... H04W 76/25; H04W 76/30; H04W 76/34; H04W 40/02; H04W 40/12; H04W 24/08; H04W 52/26; H04W 52/265; H04W 52/267; H04W 52/0209; H04W 52/0212; H04W 52/0251; H04W 52/0258; H04W 52/0225; H04W 52/0245; H04L 43/16; H04L 43/08; H04L 43/0876; H04L 43/0882; H04L 43/0888; H04L 43/0894; H04L 43/06; H04L 43/062; H04L 65/80
See application file for complete search history.

(56) References Cited

FOREIGN PATENT DOCUMENTS

| | | |
|---|---|---|
| CN | 110996376 A | 4/2020 |
| CN | 111132382 A | 5/2020 |
| EP | 3908039 A1 * | 11/2021 |

OTHER PUBLICATIONS

Apple: "UE Assistance Information for EN-DC", 3GPP Draft; R2-1912467 UE Assistance Information for EN-DC V0, 3rd Generation Partnership Project (3GPP), Mobile Competence Centre; 650, Route Des Lucioles ; F-06921 Sophia-Antipolis Cedex; France vol. RAN WG2, No. Chongqing, China; Oct. 14, 2019-Oct. 18, 2019 Oct. 4, 2019 (Oct. 4, 2019), XP051804485.

* cited by examiner

DATA TRANSMISSION METHOD, DATA TRANSMISSION APPARATUS, STORAGE MEDIUM, AND TERMINAL FOR DUAL CONNECTION MODE OF NON-STANDALONE NETWORKING

CROSS-REFERENCE TO RELATED APPLICATIONS

This application claims priority to Chinese Patent Application No. 202010438520.6 filed on May 22, 2020, the disclosure of which is hereby incorporated by reference in its entirety.

BACKGROUND

The non-standalone (NSA) networking mode is a converged networking mode of the fifth generation (5G) new radio (NR) and the fourth generation (4G) long term evolution (LTE) network communication system. For the 4G network, after years of development, the technological development has matured and the infrastructure construction is well developed.

The NSA networking mode is to upgrade and deploy the 5G network system on the basis of the 4G networks, that is, it is a way in which the 4G and 5G share the core network. Under this mode, investment in the infrastructure construction can be reduced, network construction expenditures can be saved, and the large-area coverage and rapid promotion of the 5G can be achieved in the short term, which are conducive to the development process of the 5G.

SUMMARY

The present disclosure relates generally to the field of terminal technologies, and more specifically, to a data transmission method, a data transmission apparatus and a storage medium.

According to an aspect of embodiments of the present disclosure, there is provided a data transmission method, which is applied to a terminal that uses a dual connection mode of non-standalone networking for data transmission, including: monitoring a network signal quality in the dual connection mode of non-standalone networking, and monitoring a real-time data packet transmission rate of a data packet transmitted and received by the terminal; and adjusting, based on the network signal quality and the real-time data packet transmission rate, the dual connection mode of non-standalone networking, which includes turning off the dual connection mode of non-standalone networking or maintaining the dual connection mode of non-standalone networking.

In some embodiments, the adjusting the dual connection mode of non-standalone networking based on the network signal quality and the real-time data packet transmission rate includes: adjusting the dual connection mode of non-standalone networking based on the network signal quality if the real-time data packet transmission rate is greater than a first transmission rate threshold; and maintaining the dual connection mode of non-standalone networking or turning off the dual connection mode of non-standalone networking based on the network signal quality if the real-time data packet transmission rate is less than the first transmission rate threshold.

In some embodiments, the adjusting the dual connection mode of non-standalone networking based on the network signal quality includes: maintaining the dual connection mode of non-standalone networking if a new radio network signal quality in the dual connection mode of non-standalone networking is greater than a first new radio network signal quality threshold and a long-term evolution network signal quality in the dual connection mode of non-standalone networking is greater than a first long-term evolution network signal quality threshold; or adjusting an antenna transmitting power of the terminal, and adjusting the dual connection mode of non-standalone networking based on the network signal quality after adjusting the antenna transmitting power if the new radio network signal quality in the dual connection mode of non-standalone networking is less than the first new radio network signal quality threshold and the long-term evolution network signal quality in the dual connection mode of non-standalone networking is less than the first long-term evolution network signal quality threshold; or turning off the dual connection mode of non-standalone networking if the new radio network signal quality in the dual connection mode of non-standalone networking is less than the first new radio network signal quality threshold and the long-term evolution network signal quality in the dual connection mode of non-standalone networking is greater than the first long-term evolution network signal quality threshold; or maintaining the dual connection mode of non-standalone networking if the new radio network signal quality in the dual connection mode of non-standalone networking is greater than the first new radio network signal quality threshold and the long-term evolution network signal quality in the dual connection mode of non-standalone networking is less than the first long-term evolution network signal quality threshold.

In some embodiments, the data transmission method further includes: turning on the dual connection mode of non-standalone networking before the adjusting the dual connection mode of non-standalone networking based on the network signal quality if the real-time data packet transmission rate is greater than the first transmission rate threshold and the dual connection mode of non-standalone networking is not enabled.

In some embodiments, the adjusting the dual connection mode of non-standalone networking based on the network signal quality after adjusting the antenna transmitting power includes: turning off the dual connection mode of non-standalone networking if the new radio network signal quality after adjusting the antenna transmitting power is less than the first new radio network signal quality threshold and the long-term evolution network signal quality after adjusting the antenna transmitting power is less than the first long-term evolution network signal quality threshold.

In some embodiments, the turning off the dual connection mode of non-standalone networking based on the network signal quality includes: turning off the dual connection mode of non-standalone networking if the new radio network signal quality in the dual connection mode of non-standalone networking is less than the first new radio network signal quality threshold.

In some embodiments, the adjusting the dual connection mode of non-standalone networking based on the network signal quality and the real-time data packet transmission rate includes: turning off the dual connection mode of non-standalone networking if a transmission rate of the data packet transmitted through a new radio network is less than a second transmission rate threshold and a new radio network signal quality is less than a predetermined network signal quality threshold.

In some embodiments, the data transmission method further includes: turning on the dual connection mode of non-standalone networking if it is monitored that a cell handover occurs in the terminal, after turning off the dual connection mode of non-standalone networking.

According to another aspect of the embodiments of the present disclosure, there is provided a data transmission apparatus, which is applied to a terminal that uses a dual connection mode of non-standalone networking for data transmission, including: a signal quality monitoring component configured to monitor a network signal quality in the dual connection mode of non-standalone networking; a data packet monitoring component configured to monitor a real-time data packet transmission rate of a data packet transmitted and received by the terminal; and a network control component configured to adjust, based on the network signal quality and the real-time data packet transmission rate, the dual connection mode of non-standalone networking, which includes turning off the dual connection mode of non-standalone networking or maintaining the dual connection mode of non-standalone networking.

In some embodiments, when adjusting the dual connection mode of non-standalone networking based on the network signal quality and the real-time data packet transmission rate, the network control component is configured to: adjust the dual connection mode of non-standalone networking based on the network signal quality if the real-time data packet transmission rate is greater than a first transmission rate threshold; and maintain the dual connection mode of non-standalone networking or turn off the dual connection mode of non-standalone networking based on the network signal quality if the real-time data packet transmission rate is less than the first transmission rate threshold.

In some embodiments, when adjusting the dual connection mode of non-standalone networking based on the network signal quality, the network control component is configured to: maintain the dual connection mode of non-standalone networking if a new radio network signal quality in the dual connection mode of non-standalone networking is greater than a first new radio network signal quality threshold and a long-term evolution network signal quality in the dual connection mode of non-standalone networking is greater than a first long-term evolution network signal quality threshold; or adjust an antenna transmitting power of the terminal, and adjust the dual connection mode of non-standalone networking based on the network signal quality after adjusting the antenna transmitting power if the new radio network signal quality in the dual connection mode of non-standalone networking is less than the first new radio network signal quality threshold and the long-term evolution network signal quality in the dual connection mode of non-standalone networking is less than the first long-term evolution network signal quality threshold; or turn off the dual connection mode of non-standalone networking if the new radio network signal quality in the dual connection mode of non-standalone networking is less than the first new radio network signal quality threshold and the long-term evolution network signal quality in the dual connection mode of non-standalone networking is greater than the first long-term evolution network signal quality threshold; or maintain the dual connection mode of non-standalone networking if the new radio network signal quality in the dual connection mode of non-standalone networking is greater than the first new radio network signal quality threshold and the long-term evolution network signal quality in the dual connection mode of non-standalone networking is less than the first long-term evolution network signal quality threshold.

In some embodiments, the network control component is further configured to: turn on the dual connection mode of non-standalone networking before adjusting the dual connection mode of non-standalone networking based on the network signal quality if the real-time data packet transmission rate is greater than the first transmission rate threshold and the dual connection mode of non-standalone networking is not enabled.

In some embodiments, when adjusting the dual connection mode of non-standalone networking based on the network signal quality after adjusting the antenna transmitting power, the network control component is configured to: turn off the dual connection mode of non-standalone networking if the new radio network signal quality after adjusting the antenna transmitting power is less than the first new radio network signal quality threshold and the long-term evolution network signal quality after adjusting the antenna transmitting power is less than the first long-term evolution network signal quality threshold.

In some embodiments, when turning off the dual connection mode of non-standalone networking based on the network signal quality, the network control component is configured to: turn off the dual connection mode of non-standalone networking if the new radio network signal quality in the dual connection mode of non-standalone networking is less than the first new radio network signal quality threshold.

In some embodiments, when adjusting the dual connection mode of non-standalone networking based on the network signal quality and the real-time data packet transmission rate, the network control component is configured to: turn off the dual connection mode of non-standalone networking if a transmission rate of the data packet transmitted through a new radio network is less than a second transmission rate threshold and a new radio network signal quality is less than a predetermined network signal quality threshold.

In some embodiments, the network control component is further configured to: monitor whether a cell handover occurs in the terminal after turning off the dual connection mode of non-standalone networking; and turn on the dual connection mode of non-standalone networking if it is monitored that the cell handover occurs in the terminal.

According to yet another aspect of the embodiments of the present disclosure, there is provided a data transmission apparatus including a processor; and a memory for storing instructions executable by the processor, wherein, the processor is configured to: execute the data transmission method according to any one of the foregoing items.

According to yet another aspect of embodiments of the present disclosure, there is provided a non-transitory computer-readable storage medium having stored therein instructions that, when executed by a processor of a mobile terminal, causes the mobile terminal to execute the data transmission method according to any one of the foregoing items.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of various embodiments of the present disclosure.

DETAILED DESCRIPTION

Description will now be made in detail with reference to some embodiments, examples of which are illustrated in the accompanying drawings. The following description refers to the accompanying drawings in which the same numbers in different drawings represent the same or similar elements unless otherwise indicated. The implementations set forth in the following exemplary embodiments do not represent all implementations consistent with the present disclosure. Instead, they are merely examples of devices and methods consistent with aspects related to the present disclosure as recited in the appended claims.

In the NSA networking mode, the terminal may need to be connected to the 4G network and the 5G network at the same time. When the terminal uses the dual connection mode of common communication between the 4G network and the 5G network for data transmission in the NSA mode, there might be a phenomenon in which the transmission rate is slower but the transmission rate is fast after switching to the 4G network for data transmission.

The data transmission method provided in various embodiments of the present disclosure is applied to a terminal that uses a non-standalone (NSA) dual connection, e.g., Evolved Universal Terrestrial Radio Access New Radio (EUTRA-NR) Dual Connection (EN-DC) mode, for data transmission. The EN-DC in NSA mode is the architecture of the fourth generation LTE network (4G network) as a master node, and the NR network (5G network) as an auxiliary node. When the terminal in the NSA mode transmits data, the EN-DC dual connection mode of the terminal transmits and receives the data of data packets, and the data arrives at the core network through the 4G or 5G base station. The terminal in the embodiments of the present disclosure may be, for example, a smart phone, a tablet computer, a wearable device, a PC, or the like. The types of terminals to which the data transmission is applied are not limited in the embodiments of the present disclosure.

Figure 1:
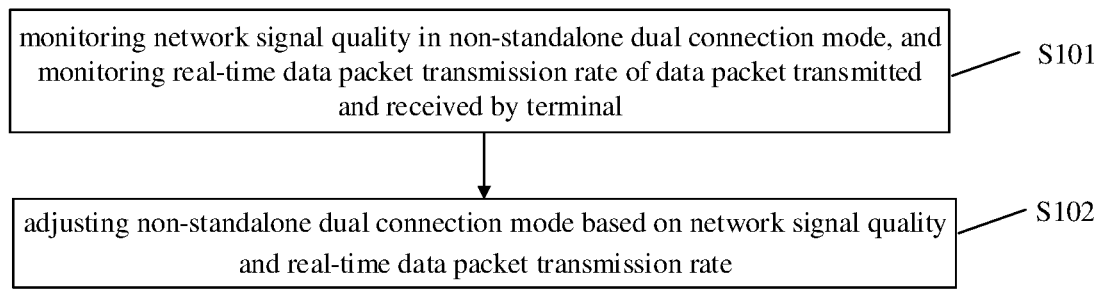
FIG. 1 is a flowchart illustrating a data transmission method according to some embodiments of the present disclosure.

FIG. 1 is a flowchart illustrating a data transmission method according to some embodiments. Referring to FIG. 1, the data transmission method includes the following steps.

In step S101, a network signal quality in the NSA EN-DC dual connection mode is monitored, and a real-time data packet transmission rate of a data packet transmitted and received by the terminal is monitored.

In the embodiments of the present disclosure, the system of the terminal turns on a NAS mode, receives the real-time network signal quality of the SIM card reported by the system underlay network module by monitoring the interface of the terminal operating system. The real-time network signal quality of the SIM card provided by the interface of the operating system is used to notify each application program installed on the terminal and each module in the operating system of the current network signal quality.

After the system turns on the NAS mode, if the mobile network allocates a 5G cell to the terminal successfully, the terminal is in the EN-DC dual connection mode at this time, that is, the data packets are transmitted and received through the 4G base station or the 5G base station simultaneously. Understandably, the network signal qualities of the 4G and 5G cells in the EN-DC dual connection mode is monitored by the system.

In the embodiments of the present disclosure, the real-time data packet transmission rate of the data packet transmitted and received by the terminal can be monitored periodically. For example, the real-time data packet transmission rate is obtained by reading the total number of data packets transmitted and received by the operating system network module every second, and calculating the difference of the total number of data packets transmitted and received by the operating system network module between two adjacent seconds. For example, at the $n^{th}$ second, the total number of data packets transmitted and received by the operating system network module is 100M, and at the $(n+1)^{th}$ second, the total number of data packets transmitted and received by the operating system network module is 120M, it can be seen that the real-time data packet transmission rate at the $(n+1)^{th}$ second is 120-100, that is, 20M/s.

In step S102, the NSA EN-DC dual connection mode is adjusted based on the network signal quality and the real-time data packet transmission rate.

The adjusting the NSA EN-DC dual connection mode includes turning off the NSA EN-DC dual connection mode or maintaining the NSA EN-DC dual connection mode. For example, according to the monitored network signal quality and real-time data packet transmission rate, when the monitored network signal quality and real-time data packet transmission rate satisfy the predetermined conditions, the EN-DC dual connection mode is maintained, that is, the data packets are transmitted and received through the 4G base station or the 5G base station simultaneously. Alternatively, according to the monitored network signal quality and real-time data packet transmission rate, when the monitored network signal quality and real-time data packet transmission rate satisfy the predetermined conditions, the NSA EN-DC dual connection mode is turned off, that is, the data packets are transmitted and received through the 4G base station.

According to the embodiments of the present disclosure, by monitoring a network signal quality in the NSA EN-DC dual connection mode and a real-time data packet transmission rate of a data packet transmitted and received by the terminal, and automatically and dynamically switching the EN-DC dual connection and the single 4G network connection based on the network signal quality and the real-time data packet transmission rate, there is no need for the user to manually switch the network, the effective transmission and reception of the terminal data packet is ensured, and the increase in power consumption caused by always relying on the EN-DC dual connection is avoided.

Figure 2:
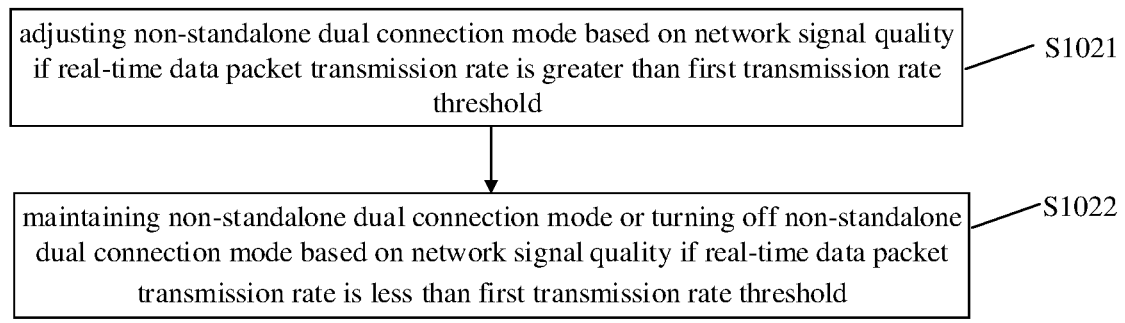
FIG. 2 is a flowchart of adjusting a non-standalone (NSA) dual connection, e.g., Evolved Universal Terrestrial Radio Access New Radio (EUTRA-NR) Dual Connection (EN-DC) mode, for data transmission based on a network signal quality and a real-time data packet transmission rate according to another exemplary embodiment of the present disclosure.

FIG. 2 is a flowchart of adjusting the NSA EN-DC dual connection mode based on the network signal quality and the real-time data packet transmission rate according to another exemplary embodiment of the present disclosure. As shown in FIG. 2, the adjusting the NSA EN-DC dual connection mode based on the network signal quality and the real-time data packet transmission rate includes the following steps.

In step S1021, the NSA EN-DC dual connection mode is adjusted based on the network signal quality if the real-time data packet transmission rate is greater than a first transmission rate threshold.

In step S1022, the NSA EN-DC dual connection mode is maintained or the NSA EN-DC dual connection mode is turned off based on the network signal quality if the real-time data packet transmission rate is less than the first transmission rate threshold.

Herein, the first transmission rate threshold can be predetermined by the user according to usage requirements, and if the real-time data packet transmission rate is greater than the predetermined first transmission rate threshold, it is determined that a large number of data packets are transmitted and received by the user currently, that is, the data packet transmission rate is in a high rate mode.

If the real-time data packet transmission rate is less than the predetermined first transmission rate threshold, it is determined that the number of data packets which are transmitted and received by the user currently is less, that is, the data packet transmission rate is in a low rate mode.

The terminal can turn on or off the NSA EN-DC dual connection mode by invoking the interface of the operating system. Understandably, the adjusting the NSA EN-DC dual connection mode includes turning off the NSA EN-DC dual connection mode. The maintaining the NSA EN-DC dual connection is that the terminal is connected to the 4G network and the 5G network at the same time, and when the data transmission of transmitting and receiving data packets is performed, the data packets can be transmitted through the 4G cell and the 5G cell simultaneously.

Herein, when turning off the NSA EN-DC dual connection mode, the terminal is only connected to the 4G network, and the data packet is transmitted through the 4G cell alone when the data transmission of transmitting and receiving data packets is performed.

If the real-time data packet transmission rate is greater than the first transmission rate threshold, that is, when the data packet transmission rate is in the high rate mode, the NAS EN-DC dual connection mode is adjusted based on the network signal quality.

If the real-time data packet transmission rate is less than the first transmission rate threshold, that is, when the data packet transmission rate is in the low rate mode, the NAS EN-DC dual connection mode is maintained, or it is also can be that the NAS EN-DC dual connection mode is turned off based on the network signal quality. According to the network signal qualities of the 4G network and the 5G network and the real-time data packet transmission rate, the NAS EN-DC dual connection mode is maintained or turned off, so as to maintain more efficient data packet transmission by dynamically switching the EN-DC and the single 4G network connection.

In some embodiments of the present disclosure, if the real-time data packet transmission rate is greater than the predetermined first transmission rate threshold, it is determined that a large number of data packets are currently transmitted and received by the user, that is, the data packet transmission rate is in a high rate mode. When the data packet transmission rate is in the high rate mode, the NSA EN-DC dual connection mode is adjusted based on the network signal quality, which includes the following situations.

(1) When the 5G network signal quality is greater than the first NR network signal quality threshold, it represents that the 5G network signal is good. When the 5G network signal quality is less than the first NR network signal quality threshold, it represents that the 5G network signal is poor.

(2) When the 4G network signal quality is greater than the first LTE network signal quality threshold, it represents that the 4G network signal is good. When the 4G network signal quality is less than the first LTE network signal quality threshold, it represents that the 4G network signal is poor.

If it is determined, in the NSA EN-DC dual connection mode, that the 5G network signal is good and the 4G network signal is good according to the 5G network signal and the first NR network signal quality threshold, and the 4G network signal and the first LTE network signal quality threshold, respectively, the network condition of the terminal is good at this time, and the NAS EN-DC dual connection mode is maintained, and the effective transmission and reception of data packets can be maintained during the data transmission.

If it is determined that the 5G network signal is poor and the 4G network signal is also poor according to the 5G network signal and the first NR network signal quality threshold, and the 4G network signal and the first LTE network signal quality threshold, respectively, the antenna transmitting power of the terminal is adjusted, and the signal changes of the 5G network and the 4G network after adjusting the antenna transmitting power are waited, and the NAS EN-DC dual connection mode is adjusted based on the network signal quality of the 5G network and the network signal quality of the 4G network after adjusting the antenna transmitting power.

If it is determined that the 5G network signal is poor and the 4G network signal is good according to the 5G network signal and the first NR network signal quality threshold, and the 4G network signal and the first LTE network signal quality threshold respectively, the NAS EN-DC dual connection mode is turned off by the terminal to turn off EN-DC through invoking the interface of the operating system, that is, the 5G network connection is disconnected and it is switched to the single 4G network connection. When the terminal performs data transmission, the data packet is transmitted on the 4G network with good network signal to ensure the data transceiving rate.

If it is determined that the 5G network signal is good and the 4G network signal is poor according to the 5G network signal and the first NR network signal quality threshold, and the 4G network signal and the first LTE network signal quality threshold, respectively, at this time, in order to guarantee the transmission and reception of data packets through the 5G network to ensure the effective transmission and reception of data, it is necessary to maintain the NSA EN-DC dual connection mode.

Figure 3:
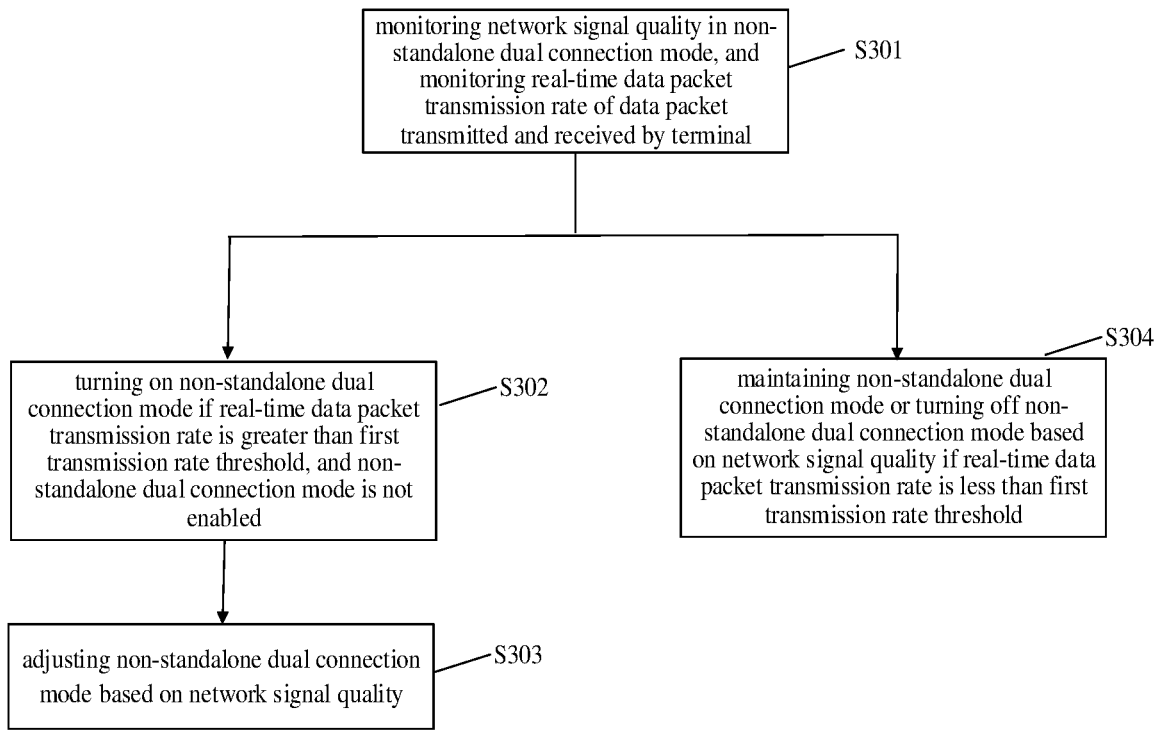
FIG. 3 is a flowchart illustrating a data transmission method according to another exemplary embodiment of the present disclosure.

FIG. 3 is a flowchart illustrating a data transmission method according to another exemplary embodiment of the present disclosure. As shown in FIG. 3, the data transmission method includes the following steps.

In step S301, a network signal quality in the NSA EN-DC dual connection mode is monitored, and a real-time data packet transmission rate of a data packet transmitted and received by the terminal is monitored.

In step S302, the NSA EN-DC dual connection mode is turned on if the real-time data packet transmission rate is greater than a first transmission rate threshold, and the NSA EN-DC dual connection mode is not enabled.

In the embodiments of the present disclosure, if the real-time data packet transmission rate is greater than the first transmission rate threshold, it is determined that a large number of data packets are currently transmitted and received by the user, that is, the data packet transmission rate is in a high rate mode.

Herein, if the terminal is not in the NSA EN-DC dual connection mode, at this time, the data transmission is performed by the terminal only through the 4G cell, in order to ensure the transmission speed of data packets, the NSA EN-DC dual connection mode is turned on by the terminal through invoking the interface of the operating system, to wait the network to allocate the 5G cell resources to connect to the 5G network.

In step S303, the NSA EN-DC dual connection mode is adjusted based on the network signal quality.

When the terminal accesses the 5G cell, the NSA EN-DC dual connection mode is adjusted based on the network signal quality.

In step S304, the NSA EN-DC dual connection mode is maintained or the NSA EN-DC dual connection mode is turned off based on the network signal quality if the real-time data packet transmission rate is less than the first transmission rate threshold.

In some embodiments of the present disclosure, if the NR network signal quality after adjusting the antenna transmitting power is less than the first NR network signal quality threshold, and the LTE network signal quality after adjusting the antenna transmitting power is less than the first LTE network signal quality threshold, the NSA EN-DC dual connection mode is turned off.

If it is determined that the current 5G network signal is poor, and the 4G network signal is also poor in the terminal currently, the antenna transmitting power of the terminal is adjusted, and the signal changes of the 5G network and the 4G network after adjusting the antenna transmitting power are waited.

If the 5G network signal quality after adjusting the antenna transmitting power is less than the first NR network signal quality threshold, and the 4G network signal quality after adjusting the antenna transmitting power is less than the first LTE network signal quality threshold, it is indicated that the network signal cannot be enhanced by adjusting the antenna transmitting power. In order to avoid that continuous increase in transmit power leads to increased terminal power consumption, and results in the phenomenon such as terminal heat generation, increased power consumption, and the like, the NSA EN-DC dual connection mode is turned off by the terminal through invoking the interface of the operating system, that is, the 5G network connection is disconnected, and it is switched to the single 4G network connection. The data transmission through the 4G network connection is ensured, and at the same time the power consumption of the terminal is reduced.

In some embodiments of the present disclosure, if the NR network signal quality in the NSA EN-DC dual connection mode is less than the first NR network signal quality threshold, the NSA EN-DC dual connection mode is turned off.

If the real-time data packet transmission rate is less than the predetermined first transmission rate threshold, it is determined that the number of data packets which are currently transmitted and received by the user is less, that is, the data packet transmission rate is in a low rate mode. When the network transmission speed is in a low rate mode, if the 5G network signal quality is less than the first NR network signal quality threshold in the NSA EN-DC dual connection mode, that is, the network signal is poor, the NSA EN-DC dual connection mode is turned off at this time, that is, the 5G network connection is disconnected and it is switched to the single 4G network connection. It can not only meet the data packet transceiving requirements in the low rate mode, but also save the waste of resources caused by simultaneously connecting to the 5G network, and reduce the terminal power consumption.

In some embodiments of the present disclosure, if the transmission rate of the data packet transmitted through a NR network is less than a second transmission rate threshold, and a NR network signal quality is less than a predetermined network signal quality threshold, the NSA EN-DC dual connection mode is turned off.

Understandably, the monitoring a real-time data packet transmission rate of a data packet transmitted and received by the terminal can be monitoring the transmission rate of the data packet transmitted by the terminal through the 5G network and the transmission rate of the data packet transmitted by the terminal through the 4G network, respectively. The embodiments of the present disclosure can monitor the transmission rate of the data packet transmitted by the terminal through the 5G network, and compare the transmission rate of the data packet transmitted through the 5G network with the second transmission rate threshold (the predetermined transmission rate of the data packet transmitted through the 5G network) to determine whether the transmission rate of the data packet transmitted currently by the user is in the high rate mode or the low rate mode.

When the transmission rate of a data packet transmitted through the 5G network is less than the second transmission rate threshold, that is, the transmission rate of the data packet transmitted currently by the user is in the low rate mode, at this time, if it is monitored simultaneously that the 5G network signal quality is less than the predetermined network signal quality threshold, that is, the 5G network signal is poor, the NSA EN-DC dual connection mode is turned off and it is switched to the single 4G network connection to ensure the data packet transceiving rate of the terminal under the 4G network connection.

Figure 4:
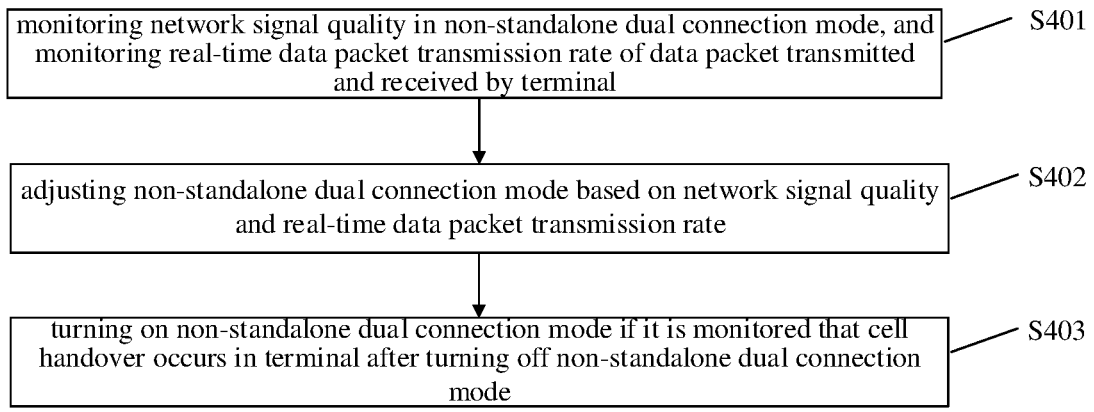
FIG. 4 is a flowchart illustrating a data transmission method according to still another exemplary embodiment of the present disclosure.

FIG. 4 is a flowchart illustrating a data transmission method according to yet another exemplary embodiment of the present disclosure. As shown in FIG. 4, the data transmission method includes the following steps.

In step S401, a network signal quality in the NSA EN-DC dual connection mode is monitored, and a real-time data packet transmission rate of a data packet transmitted and received by the terminal is monitored.

In step S402, the NSA EN-DC dual connection mode is adjusted based on the network signal quality and the real-time data packet transmission rate.

In step S403, the NSA EN-DC dual connection mode is turned on if it is monitored that the cell handover occurs in the terminal after turning off the NSA EN-DC dual connection mode.

The change of the information of the cell where the terminal resides is monitored after turning off the NSA EN-DC dual connection mode. If it is monitored that the cell handover occurs in the terminal, for example, it is switched from a previous cell A to a current cell B, the terminal turns on the NSA EN-DC by invoking the interface of the operating system. By monitoring the cell handover occurs in the terminal, it is ensured that the terminal can switch and adjust the network in real time according to the actual situation of the network connection, and maximize the advantages of the EN-DC dual connection mode to further ensure the high efficiency of data transmission.

Figure 5:
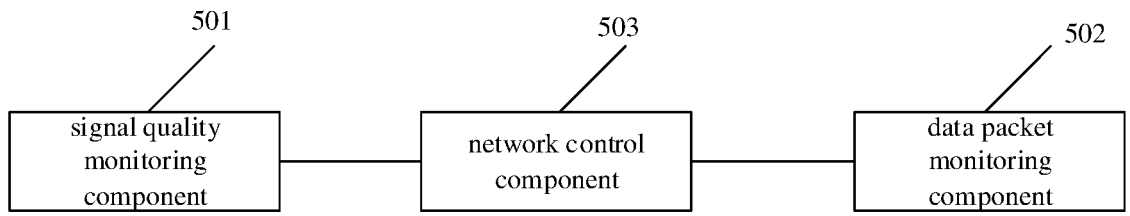
FIG. 5 is a block diagram illustrating a data transmission apparatus according to some embodiments of the present disclosure.

FIG. 5 is a block diagram illustrating a data transmission apparatus according to some embodiments of the present disclosure. As shown in FIG. 5, the data transmission apparatus 500 is applied to a terminal that uses the NSA EN-DC dual connection mode for data transmission, and the data transmission apparatus 500 includes a signal quality monitoring component 501, a data packet monitoring component 502, and a network control component 503.

The signal quality monitoring component 501 is configured to monitor a network signal quality in the NSA EN-DC dual connection mode.

The data packet monitoring component 502 is configured to monitor a real-time data packet transmission rate of a data packet transmitted and received by the terminal.

The network control component 503 is configured to, based on the network signal quality and the real-time data packet transmission rate, adjust the NSA EN-DC dual connection mode, which includes turning off the NSA EN-DC dual connection mode or maintaining the NSA EN-DC dual connection mode.

In some embodiments, when adjusting the NSA EN-DC dual connection mode based on the network signal quality and the real-time data packet transmission rate, the network control component 503 is configured to: adjust the NSA EN-DC dual connection mode based on the network signal quality if the real-time data packet transmission rate is greater than a first transmission rate threshold; and maintain the NSA EN-DC dual connection mode or turn off the NSA EN-DC dual connection mode based on the network signal quality if the real-time data packet transmission rate is less than the first transmission rate threshold.

In some embodiments, when adjusting the NSA EN-DC dual connection mode based on the network signal quality, the network control component 503 is configured to: maintain the NSA EN-DC dual connection mode if a NR network signal quality in the NSA EN-DC dual connection mode is greater than a first NR network signal quality threshold, and a LTE network signal quality in the NSA EN-DC dual connection mode is greater than a first LTE network signal quality threshold; or adjust an antenna transmitting power of the terminal, and adjust the NSA EN-DC dual connection mode based on the network signal quality after adjusting the antenna transmitting power if the NR network signal quality in the NSA EN-DC dual connection mode is less than the first NR network signal quality threshold, and the LTE network signal quality in the NSA EN-DC dual connection mode is less than the first LTE network signal quality threshold; or turn off the NSA EN-DC dual connection mode if the NR network signal quality in the NSA EN-DC dual connection mode is less than the first NR network signal quality threshold and the LTE network signal quality in the NSA EN-DC dual connection mode is greater than the first LTE network signal quality threshold; or maintain the NSA EN-DC dual connection mode if the NR network signal quality in the NSA EN-DC dual connection mode is greater than the first NR network signal quality threshold and the LTE network signal quality in the NSA EN-DC dual connection mode is less than the first LTE network signal quality threshold.

In some embodiments, the network control component 503 is further configured to: turn on the NSA EN-DC dual connection mode before adjusting the NSA EN-DC dual connection mode based on the network signal quality if the real-time data packet transmission rate is greater than the first transmission rate threshold, and the NSA EN-DC dual connection mode is not enabled.

In some embodiments, when adjusting the NSA EN-DC dual connection mode based on the network signal quality after adjusting the antenna transmitting power, the network control component 503 is configured to: turn off the NSA EN-DC dual connection mode if the NR network signal quality after adjusting the antenna transmitting power is less than the first NR network signal quality threshold, and the LTE network signal quality after adjusting the antenna transmitting power is less than the first LTE network signal quality threshold.

In some embodiments, when turning off the NSA EN-DC dual connection mode based on the network signal quality, the network control component 503 is configured to: turn off the NSA EN-DC dual connection mode if the NR network signal quality in the NSA EN-DC dual connection mode is less than the first NR network signal quality threshold.

In some embodiments, when adjusting the NSA EN-DC dual connection mode based on the network signal quality and the real-time data packet transmission rate, the network control component 503 is configured to: turn off the NSA EN-DC dual connection mode if a transmission rate of the data packet transmitted through a NR network is less than a second transmission rate threshold, and a NR network signal quality is less than a predetermined network signal quality threshold.

In some embodiments, the network control component 503 is further configured to: monitor whether a cell handover occurs in the terminal after turning off the NSA EN-DC dual connection mode; and turn on the NSA EN-DC dual connection mode if it is monitored that the cell handover occurs in the terminal.

With respect to the device in the above embodiments, the implementations for performing operations by individual modules therein have been described in detail in the embodiments regarding the methods, which will not be elaborated herein.

The present disclosure will further describe the process of realizing data transmission for the data transmission apparatus 500 in conjunction with the following embodiments.

The present disclosure includes the signal quality monitoring component 501 which receives the real-time network signal quality of the SIM card used by the terminal, reported by the system underlay network module of the operating system through monitoring the interface of the terminal operating system. The interface used by the operating system to report the network signal quality can be used to notify respective application programs installed on the terminal and each module in the system of the current network signal quality of the SIM card.

After the system turns on the NSA mode, if the mobile network successfully allocates the 5G cells, the terminal is in the EN-DC dual connection mode now, that is, the terminal is connected to both the 4G cell and the 5G cell. The signal quality monitoring component 501 simultaneously monitors the network signal qualities of 4G and 5G cells, and records the network signal qualities of 4G and 5G respectively.

The present disclosure includes the data packet monitoring component 502 which monitors the rate of a data packet transmitted and received by the terminal, and calculates the difference by reading the total amount of data packets transmitted and received by the operating system network module every second to obtain the network transmission rate. For example, if the total amount of data packets transmitted and received by the terminal at the $10^{th}$ second is 100M, and the total amount of data packets transmitted and received at the $11^{th}$ second is 120M, the rate at the $11^{th}$ second is (120−100), that is, the rate at the $11^{th}$ second is 20M/s.

The present disclosure includes the network control component 503 which can turn on or off the NSA EN-DC dual connection mode by invoking the interface of the operating system. The turning on the NSA EN-DC dual connection mode is that the terminal is connected to the 4G cell and the 5G cell simultaneously, and the data packets can be transmitted through the 4G cell and the 5G cell at the same time. The turning off the NSA EN-DC dual connection mode is that the terminal is only connected to the 4G cell, and the data packet is only transmitted through the 4G cell.

The data packet monitoring component 502 sets in advance a first transmission rate threshold, for example, 20M/s, when the rate of data traffic exceeds the first transmission rate threshold, it is indicated that the user currently needs to transmit and receive a large number of data packets, and the data packet transmission rate is in a high-rate mode, and at this time, the high-rate mode is sent to the network control component 503. If the real-time data packet transmission rate is less than the first transmission rate threshold, it is determined that a small number of data packets are currently transmitted and received by the user, that is, the data packet transmission rate is in a low rate mode.

If the current network is in the NSA EN-DC dual connection mode, the network control component 503 continuously receives the network signal qualities of the 4G and 5G cells of the current SIM card fed back by the signal quality monitoring component 501. In the embodiments of the present disclosure, the following situation is taken as an example for description, but it is not limited to this embodiment.

If it is fed back by the signal quality monitoring component 501 that the network signal quality of the 4G cell is good, and the signal quality of the 5G cell is also good, the network control component 503 does not perform processing, and in this case, the network speed should be very fast, and a high rate can be guaranteed.

If it is fed back by the signal quality monitoring component 501 that the network signal quality of the 4G cell is poor, and the signal quality of the 5G cell is also poor, the network control component 503 does not perform processing. Because both the network signals of the 4G cell and the network signal of the 5G cell are poor, at this time, the network control component 503 needs to adjust the antenna transmitting power, and wait for the signal change after adjusting the power. After adjusting the antenna transmitting power, if the signals of the 4G and 5G cells are still poor, the NSA EN-DC dual connection mode is turned off, and only the 4G cell connection is kept to avoid the increase in terminal power consumption caused by continuous large transmitting power.

If it is fed back by the signal quality monitoring component 501 that the network signal quality of the 4G cell is good, and the signal quality of the 5G cell is poor, the interface is invoked and the NSA EN-DC is turned off by the network control component 503, that is, the 5G cell connection is disconnected. During data transmission, the data packets only run in 4G cells with better signal, and the transceiving rate is accelerated.

If it is fed back by the signal quality monitoring component 501 that the signal quality of the 4G cell is poor, and the signal quality of the 5G cell is good, the network control component 503 does not perform processing, because only when the connection of the 5G cell is guaranteed, the transceiving rate of the data packet can be guaranteed.

After the instruction of the high rate mode is received by the network control component 503, if the current network is not in EN-DC, and only registered to the 4G cell, the system interface is invoked, the EN-DC dual connection is turned on, and it is waited for the network to allocate 5G cell resources. After the terminal also accesses the 5G cell at the same time, the above monitoring steps are performed continuously by the network control component 503, and the statuses of the EN-DC are invoked at any time.

After the network control component 503 has received the instruction of the low rate mode sent by the packet monitoring component 502, the network control component 503 can maintain the state of the EN-DC, and the signal quality of the EN-DC can usually satisfy the low rate requirement.

The network control component 503 can turn off the NSA EN-DC, and the terminal only remains connected to the 4G cell, which can guarantee the requirement of the low rate data transmission.

After turning off the NSA EN-DC, the network control component 503 monitors changes in the information of the cell where the terminal resides. If the cell where the terminal resides changes, for example, it switches from the cell A to the cell B, the network control component 503 restarts the EN-DC to guarantee that the 5G terminal can use the characters of EN-DC and provide a possible high rate in the data transmission.

Figure 6:
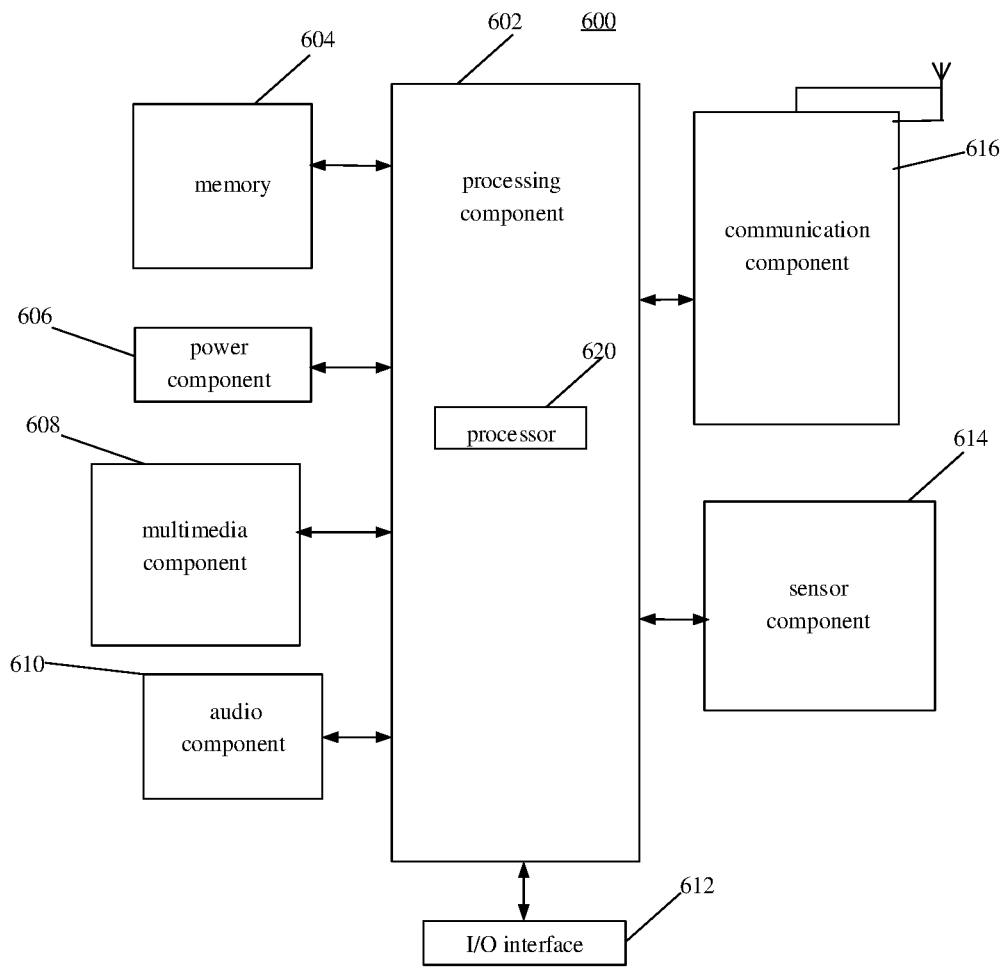
FIG. 6 is a block diagram illustrating a device according to some embodiments of the present disclosure.

FIG. 6 is a block diagram illustrating a device 600 for transmitting data according to some embodiments. For example, the device 600 can be a mobile phone, a computer, a digital broadcast terminal, a messaging device, a gaming console, a tablet, a medical device, exercise equipment, a personal digital assistant, and the like.

Referring to FIG. 6, the device 600 may include one or more of the following components: a processing component 602, a memory 604, a power supply component 606, a multimedia component 608, an audio component 610, an input/output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to implement all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, videos, etc. The memory 604 may be implemented through any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 606 supplies power to various components of the device 600. The power supply component 606 may include a power management system, one or more power sources, and any other components associated with the generation, management, and distribution of power in the device 600.

The multimedia component 608 includes a screen providing an output interface between the device 600 and a user. In some embodiments, the screen may include a liquid crystal display (LCD) and a touch panel (TP). In some embodiments, organic light-emitting diode (OLED) displays can be employed.

If the screen includes the touch panel, the screen can be implemented as a touch screen to receive input signal from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 608 includes a front camera and/or a rear camera. The front camera and/or the rear camera can receive external multimedia data while the device 600 is in an operation mode, such as a data transmission mode or a video mode. Each of the front camera and the rear camera may be a fixed optical lens system or have focus and optical zoom capability.

The audio component 610 is configured to output and/or input audio signal. For example, the audio component 610 includes a microphone (MIC) configured to receive an external audio signal when the device 600 is in an operation mode, such as a call mode, a recording mode, and a voice recognition mode. The received audio signal can be further stored in the memory 604 or transmitted via the communication component 616. In some embodiments, the audio component 610 further includes a speaker to output audio signal.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the device 600. For instance, the sensor component 614 can detect an on/off status of the device 600, relative positioning of components, e.g., the display and a keypad, of the device 600, the sensor component 614 can also detect a change in position of the device 600 or one component of the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 can also include an accelerometer sensor, a gyroscope sensor, a magnetic sensor, a pressure sensor, or a temperature sensor.

The communication component 616 is configured to facilitate wired or wireless communication between the device 600 and other devices. The device 600 can access a wireless network based on a communication standard, such as Wi-Fi, 2G, 3G, 4G, or 5G, or a combination thereof. In some embodiments, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some embodiments, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as the memory 604 including the instructions executable by the processor 620 in the device 600, for performing the above-described methods. For example, the non-transitory computer-readable storage medium can be a ROM, a random-access memory (RAM), a CD-ROM, a magnetic tape, a floppy disc, an optical data storage device, and the like.

A non-transitory computer-readable storage medium causes a mobile terminal to perform any data transmission method described above when instructions stored in the storage medium is executed by a processor of the mobile terminal.

Various embodiments of the present disclosure can have one or more of the following advantages.

By monitoring a network signal quality in the dual connection mode of non-standalone networking and a real-time data packet transmission rate of a data packet transmitted and received by the terminal, and automatically and dynamically switching between the EN-DC dual connection and the single 4G network connection based on the network signal quality and the real-time data packet transmission rate, without manually switching the networks by users, the effective transmission and reception of the terminal data packets can be ensured, and the increase in power consumption caused by always relying on the EN-DC dual connection is avoided.

The various device components, portions, units, modules, circuits, blocks, or portions may have modular configurations, or are composed of discrete components, but nonetheless can be referred to as "portions" in general. In other words, the "components," "portions," "units," "modules," "circuits," "blocks," or "portions" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

In some embodiments, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A data transmission method, applied to a terminal that uses a dual connection mode of non-standalone (NSA) networking for data transmission, the data transmission method comprising:

monitoring a network signal quality in the dual connection mode of non-standalone networking, and monitoring a real-time data packet transmission rate of a data packet transmitted and received by the terminal, the network signal quality including a new radio network signal quality in the dual connection mode of non-standalone networking and a long-term evolution network signal quality in the dual connection mode of non-standalone networking;

turning off the dual connection mode of non-standalone networking when the new radio network signal quality in the dual connection mode of non-standalone networking is less than a first new radio network signal quality threshold, and the long-term evolution network signal quality in the dual connection mode of non-standalone networking is greater than a first long-term evolution network signal quality threshold;

turning on the dual connection mode of non-standalone networking when the real-time data packet transmission rate is greater than a first transmission rate threshold, and adjusting the dual connection mode of non-standalone networking based on the network signal quality; and turning off the dual connection mode of non-standalone networking when the real-time data packet transmission rate is less than the first transmission rate threshold;

wherein:

the dual connection mode comprises an Evolved Universal Terrestrial Radio Access New Radio (EUTRA-NR) Dual Connection (EN-DC) mode for data transmission; and the terminal is configured to automatically and dynamically switch between the EN-DC dual connection and a single 4G network connection based on the network signal quality and the real-time data packet transmission rate, without manually switching networks by users, thereby ensuring effective transmission and reception of data packets of the terminal, and avoiding increase in power consumption caused by always relying on the EN-DC dual connection.

2. The data transmission method according to claim 1, wherein the adjusting the dual connection mode of non-standalone networking based on the network signal quality comprises at least one of:

maintaining the dual connection mode of non-standalone networking when a new radio network signal quality in the dual connection mode of non-standalone networking is greater than a first new radio network signal quality threshold, and a long-term evolution network signal quality in the dual connection mode of non-standalone networking is greater than a first long-term evolution network signal quality threshold;

adjusting an antenna transmitting power of the terminal, and adjusting the dual connection mode of non-standalone networking based on the network signal quality after adjusting the antenna transmitting power when the new radio network signal quality in the dual connection mode of non-standalone networking is less than the first new radio network signal quality threshold, and the long-term evolution network signal quality in the dual connection mode of non-standalone networking is less than the first long-term evolution network signal quality threshold; and maintaining the dual connection mode of non-standalone networking when the new radio network signal quality in the dual connection mode of non-standalone networking is greater than the first new radio network signal quality threshold, and the long-term evolution network signal quality in the dual connection mode of non-standalone networking is less than the first long-term evolution network signal quality threshold.

3. The data transmission method according to claim 2, wherein the adjusting the dual connection mode of non-standalone networking based on the network signal quality after adjusting the antenna transmitting power comprises:

turning off the dual connection mode of non-standalone networking when the new radio network signal quality after adjusting the antenna transmitting power is less than the first new radio network signal quality threshold, and the long-term evolution network signal quality after adjusting the antenna transmitting power is less than the first long-term evolution network signal quality threshold.

4. The data transmission method according to claim 1, further comprising:

turning on the dual connection mode of non-standalone networking before the adjusting the dual connection mode of non-standalone networking based on the network signal quality when the real-time data packet transmission rate is greater than the first transmission rate threshold and the dual connection mode of non-standalone networking is not enabled.

5. The data transmission method according to claim 1, wherein the turning off the dual connection mode of non-standalone networking based on the network signal quality comprises:

turning off the dual connection mode of non-standalone networking when a new radio network signal quality in the dual connection mode of non-standalone networking is less than a first new radio network signal quality threshold.

6. The data transmission method according to claim 1, wherein the adjusting the dual connection mode of non-standalone networking based on the network signal quality and the real-time data packet transmission rate comprises:

turning off the dual connection mode of non-standalone networking when a transmission rate of the data packet transmitted through a new radio network is less than a second transmission rate threshold, and a new radio network signal quality is less than a predetermined network signal quality threshold.

7. The data transmission method according to claim 1, further comprising:

turning on the dual connection mode of non-standalone networking when monitoring that a cell handover occurs in the terminal, after turning off the dual connection mode of non-standalone networking.

8. A data transmission apparatus, applied to a terminal that uses a dual connection mode of non-standalone networking for data transmission, comprising:

a processor; and a storage for storing instructions executed by the processor, wherein the processor is configured to:

monitor a network signal quality in the dual connection mode of non-standalone networking, the network signal quality including a new radio network signal quality in the dual connection mode of non-standalone networking and a long-term evolution network signal quality in the dual connection mode of non-standalone networking;

monitor a real-time data packet transmission rate of a data packet transmitted and received by the terminal; and turn off the dual connection mode of non-standalone networking when the new radio network signal quality in the dual connection mode of non-standalone networking is less than a first new radio network signal quality threshold, and the long-term evolution network signal quality in the dual connection mode of non-standalone networking is greater than a first long-term evolution network signal quality threshold;

turn on the dual connection mode of non-standalone networking when the real-time data packet transmission rate is greater than a first transmission rate threshold, and adjust the dual connection mode of non-standalone networking based on the network signal quality; and turn off the dual connection mode of non-standalone networking when the real-time data packet transmission rate is less than the first transmission rate threshold;

wherein:

the dual connection mode comprises an Evolved Universal Terrestrial Radio Access New Radio (EUTRA-NR) Dual Connection (EN-DC) mode for data transmission; and the terminal is configured to automatically and dynamically switch between the EN-DC dual connection and a single 4G network connection based on the network signal quality and the real-time data packet transmission rate, without manually switching networks by users, thereby ensuring effective transmission and reception of data packets of the terminal, and avoiding increase in power consumption caused by always relying on the EN-DC dual connection.

9. The data transmission apparatus according to claim 8, wherein when adjusting the dual connection mode of non-standalone networking based on the network signal quality, the processor is configured to perform at least one of:

maintaining the dual connection mode of non-standalone networking when a new radio network signal quality in the dual connection mode of non-standalone networking is greater than a first new radio network signal quality threshold and a long-term evolution network signal quality in the dual connection mode of non-standalone networking is greater than a first long-term evolution network signal quality threshold;

adjusting an antenna transmitting power of the terminal, and adjust the dual connection mode of non-standalone networking based on the network signal quality after adjusting the antenna transmitting power when the new radio network signal quality in the dual connection mode of non-standalone networking is less than the first new radio network signal quality threshold, and the long-term evolution network signal quality in the dual connection mode of non-standalone networking is less than the first long-term evolution network signal quality threshold; and maintaining the dual connection mode of non-standalone networking when the new radio network signal quality in the dual connection mode of non-standalone networking is greater than the first new radio network signal quality threshold and the long-term evolution network signal quality in the dual connection mode of non-standalone networking is less than the first long-term evolution network signal quality threshold.

10. The data transmission apparatus according to claim 9, wherein when adjusting the dual connection mode of non-standalone networking based on the network signal quality after adjusting the antenna transmitting power, the processor is configured to:

turn off the dual connection mode of non-standalone networking when the new radio network signal quality after adjusting the antenna transmitting power is less than the first new radio network signal quality threshold, and the long-term evolution network signal quality after adjusting the antenna transmitting power is less than the first long-term evolution network signal quality threshold.

11. The data transmission apparatus according to claim 8, wherein the processor is further configured to:

turn on the dual connection mode of non-standalone networking before adjusting the dual connection mode of non-standalone networking based on the network signal quality when the real-time data packet transmission rate is greater than the first transmission rate threshold, and the dual connection mode of non-standalone networking is not enabled.

12. The data transmission apparatus according to claim 8, wherein when turning off the dual connection mode of non-standalone networking based on the network signal quality, the processor is configured to:

turn off the dual connection mode of non-standalone networking when a new radio network signal quality in the dual connection mode of non-standalone networking is less than a first new radio network signal quality threshold.

13. The data transmission apparatus according to claim 8, wherein when adjusting the dual connection mode of non-standalone networking based on the network signal quality and the real-time data packet transmission rate, the processor is configured to:

turn off the dual connection mode of non-standalone networking when a transmission rate of the data packet transmitted through a new radio network is less than a second transmission rate threshold, and a new radio network signal quality is less than a predetermined network signal quality threshold.

14. The data transmission apparatus according to claim 8, wherein the processor is further configured to: monitor whether a cell handover occurs in the terminal after turning off the dual connection mode of non-standalone networking; and turn on the dual connection mode of non-standalone networking when monitoring that the cell handover occurs in the terminal.

15. A non-transitory computer-readable storage medium having stored thereon instructions that, when executed by a processor of the terminal, cause the terminal to execute the data transmission method according to claim 1.

* * * * *